(12) United States Patent
Goto

(10) Patent No.: US 9,262,426 B2
(45) Date of Patent: Feb. 16, 2016

(54) FILE STORAGE APPARATUS

(76) Inventor: Makoto Goto, Hiroshima (JP)

( * ) Notice: Subject to any disclaimer, the term of this patent is extended or adjusted under 35 U.S.C. 154(b) by 1527 days.

(21) Appl. No.: 11/705,840

(22) Filed: Feb. 14, 2007

(65) Prior Publication Data

US 2007/0198616 A1    Aug. 23, 2007

(30) Foreign Application Priority Data

Feb. 17, 2006 (JP) .................................. 2006-040311

(51) Int. Cl.
| | | |
|---|---|---|
| G06F 7/00 | (2006.01) | |
| G06F 17/00 | (2006.01) | |
| G06F 17/30 | (2006.01) | |

(52) U.S. Cl.
CPC ................................ *G06F 17/30153* (2013.01)

(58) Field of Classification Search
CPC .................................................. G06F 17/30153
USPC ......................................................... 707/200
See application file for complete search history.

(56) References Cited

U.S. PATENT DOCUMENTS

| | | | | |
|---|---|---|---|---|
| 4,782,325 | A * | 11/1988 | Jeppsson et al. ................. | 341/55 |
| 5,703,907 | A * | 12/1997 | James ............................. | 375/240 |
| 6,941,328 | B2 * | 9/2005 | Cannon .......................... | 707/204 |
| 2002/0078062 | A1 | 6/2002 | Kataoka et al. | |
| 2002/0152181 | A1 * | 10/2002 | Kanai et al. ..................... | 705/80 |

FOREIGN PATENT DOCUMENTS

| | | |
|---|---|---|
| JP | H09-153818 A | 6/1997 |
| JP | 2000-516058 A | 11/2000 |
| JP | 2002-197001 A | 7/2002 |
| JP | 2003-067253 A | 3/2003 |
| JP | 2003-116040 A | 4/2003 |
| JP | 2003-528399 A | 9/2003 |
| JP | 2005-534104 A | 11/2005 |
| WO | 98/06028 A1 | 2/1998 |
| WO | 01/13237 A1 | 2/2001 |
| WO | 01/71638 A1 | 9/2001 |
| WO | 2004/010304 A1 | 1/2004 |

OTHER PUBLICATIONS

Tetsu Narimatsu, Digital gazo mo schedule mo online de kanrisurunogajoshiki! Imaerabitai online storage & PIM, interest magazine, Japan, Kabushiki Kaisha Impress, Oct. 1, 2002, vol. 93, pp. 118-132.

* cited by examiner

*Primary Examiner* — Mahesh Dwivedi
*Assistant Examiner* — Kris Mackes
(74) *Attorney, Agent, or Firm* — Fox Rothschild LLP

(57) ABSTRACT

It is an objective of the present invention to provide a solution to automatically remove the redundancy among the user's files, and to efficiently use the memory area of the server without placing an unreasonable cost on a service provider and on a user. In order to attain the above objective, a file storage apparatus, which replaces a bit sequence, which matches a bit sequence correlated with a code and managed, with said code, thereby performing compression and storage of a file correlated with the user identification information and inputted, comprising a distribution unit for management cost, which performs distribution of management cost with respect to each user identification information, is provided. Here, the management cost for code and/or bit sequence corresponds to cost necessary for storage or maintenance of the code and/or bit sequence. Examples of the cost include cost for size of required storage area, and cost for required operation of CPU.

10 Claims, 16 Drawing Sheets

Fig. 4

|   | b1 | b2 | b3 | b4 | b5 |
|---|----|----|----|----|----|
| U1 | + | + | + | + | − |
| U2 | − | − | − | + | + |

Fig. 6

|  | Total size before compression | Total size after compression |
|---|---|---|
| U1 | Sa1 | Sb1 |
| U2 | Sa2 | Sb2 |

Fig. 8

|       | b1 | b2 | b3 | b4 | b5 |
|-------|----|----|----|----|----|
| U1    | 0  | 1  | 0  | 0  | 1  |
| U2    | 3  | 2  | 1  | 2  | 0  |
| U3    | 2  | 1  | 1  | 1  | 0  |
| Total | 5  | 4  | 2  | 3  | 1  |

Fig. 11

(1) U3 uploads "AAACCC"

| Code | Bit sequence | Number of replacements |
|---|---|---|
| c1 | AAACCC | 1 |
| User | Compressed file | |
| U3 | (c1) | |

(3) U3 uploads "BBBBBBB"

| Code | Bit sequence | Number of replacements |
|---|---|---|
| c1 | (c2)CCC | 1 |
| c2 | AAA | 2 |
| c3 | (c2)AAA | 1 |
| c4 | BBBBBBB | 1 |
| User | Compressed file | |
| U2 | (c3) | |
| U3 | (c1), (c4) | |

(5) U2 uploads "BBBB"

| Code | Bit sequence | Number of replacements |
|---|---|---|
| c1 | (c2)CCC | 1 |
| c2 | AAA | 3 |
| c3 | (c2)AAA | 1 |
| c4 | (c5)BBB | 1 |
| c5 | BBBB | 2 |
| User | Compressed file | |
| U1 | (c2) | |
| U2 | (c3), (c5) | |
| U3 | (c1), (c4) | |

(2) U2 uploads "AAAAAA"

| Code | Bit sequence | Number of replacements |
|---|---|---|
| c1 | (c2)CCC | 1 |
| c2 | AAA | 2 |
| c3 | (c2)AAA | 1 |
| User | Compressed file | |
| U2 | (c3) | |
| U3 | (c1) | |

(4) U1 uploads "AAA"

| Code | Bit sequence | Number of replacements |
|---|---|---|
| c1 | (c2)CCC | 1 |
| c2 | AAA | 3 |
| c3 | (c2)AAA | 1 |
| c4 | BBBBBBB | 1 |
| User | Compressed file | |
| U1 | (c2) | |
| U2 | (c3) | |
| U3 | (c1), (c4) | |

(6) U2 uploads "BBAAA"

| Code | Bit sequence | Number of replacements |
|---|---|---|
| c1 | (c2)CCC | 1 |
| c2 | AAA | 3 |
| c3 | (c2)AAA | 1 |
| c4 | (c5)BBB | 1 |
| c5 | (c6)BB | 2 |
| c6 | BB | 3 |
| c7 | (c6)AAA | 1 |
| User | Compressed file | |
| U1 | (c2) | |
| U2 | (c3), (c5), (c7) | |
| U3 | (c1), (c4) | |

Fig. 13

(A)
ABC <SEPARATOR> GHIJKLMNOP (B)
DEF <SEPARATOR> GHIJKLMNOP <SEPARATOR> XYZ

Fig. 15

| User identification information | Specific bit sequence |
|---|---|
| U1 | b1 |
| U2 | b5 |
| U3 | b4 |

FILE STORAGE APPARATUS

BACKGROUND OF THE INVENTION

1. Field of the Invention

The present invention relates to a file storage apparatus, a method for operating file storage apparatus, and program for storing a file.

2. Description of the Related Art

The service of leasing disk space for storing files targeting an unspecified number of users via a communication line such as the internet has been previously provided (e.g., Japanese unexamined patent publication No. 2003-67253). In this service, a directory is created in a storage unit of a server connected to a communication line such as internet with respect to each user, and the user uploads files to the directory using FTP (File Transfer Protocol) etc. for storage of the file.

In the conventional service of leasing disk space, in cases where multiple users upload the same or similar files, the same contents (e.g., same bit sequences, or byte sequences) are stored in several files, thereby causing an inefficient use of disk space.

Further, in the conventional service, where the users know each other, and further know that their files to be stored are the same or similar, it is possible to share an account or to remove the redundancy of the contents overlapping between the similar files before uploading, thereby efficiently using the storage capacity. However, in this case, a consensus among the users is necessary before uploading the files, thereby placing a burden on the users. Further, in the case of targeting an unspecified number of users, the users rarely know each other. Furthermore, where the user desires to keep the content of the file confidential, it is difficult to develop a consensus among the users.

The applicant of the present invention conceived of a method, in which information necessary for encoding the content of the file is given by a service provider of leasing disk space, this information is stored in a domain different from the domain storing the file, and the file contents are replaced with a shorter code thereby removing the redundancy of the files. For example, the bit sequence commonly appearing in the files uploaded by multiple users is extracted, a code is correlated with the bit sequence, and the specific bit sequence in the files is replaced with the code, so that the redundancy is removed, and the data is efficiently stored. Note that, in this case, it is necessary for the service provider to pay a fee for storing the information encoding the data, or to distribute the cost as a common service fee to the users. In cases where the service provider pays this cost, if a huge amount of the information for encoding is required, the overhead cost for managing the information makes it difficult to continue the service. Further, in cases where the cost is distributed to the users, if the cost is evenly distributed, the user, whose file stored does not include the content common to the other users, has to pay an unreasonable cost.

SUMMARY OF THE INVENTION

It is an objective of the present invention to provide a solution to automatically remove the redundancy among the users' files, and to efficiently use the storage of the server without applying an unreasonable cost on a service provider or a user.

In order to attain the above objective, the present invention provides a file storage apparatus, which replaces a bit sequence, which matches a bit sequence correlated with a code and managed, with said code, thereby performing compression and storage of a file correlated with the user identification information and inputted, comprising a distribution unit for management cost, which performs distribution of management costs with respect to each user identification information. Here, the management cost for code and/or bit sequence corresponds to cost necessary for storage or maintenance of the code and/or bit sequence. Examples of the cost include cost for size of required storage area, and cost for required operation of CPU. According to the aforementioned file storage apparatus, it becomes possible to appropriately distribute the management cost to the users.

In further aspects of the invention, number of replacements correlated with the user identification information is acquired with respect to each replaced bit sequence for the inputted file correlated with the user identification information, and distribution of the management cost to the users is carried out by means of the number of replacements. This makes it possible to more appropriately distribute the cost.

In further aspects of the invention, it is determined whether a bit sequence, which starts from a head of the file, matches one or multiple bit sequences correlated with the code, and a bit sequence, which is subsequent to the matching bit sequence, correlated with new code is stored. This makes it possible to automatically collect bit sequences to be managed.

In further aspects of the invention, the file is separated into fragments in accordance with a predetermined structure of the file, and the fragment is set to be a target of compression as an independent file. This makes it possible to efficiently store the file having a structure.

In further aspects of the invention, a portion or total management cost of a specific bit sequence is distributed to a specific user. This makes it possible for the user to popularize a specific term (e.g., trademark) or a specific idea.

In further aspects of the invention, a fee for file storage based on the management cost is calculated based on the management cost. This makes it possible for the service provider to acquire appropriate consideration.

According to the present invention, it becomes possible to efficiently use the memory area of the server storing the file, and to appropriately distribute the cost to the users.

BRIEF DESCRIPTION OF THE DRAWINGS

FIG. 4 is a table referenced for distributing management costs

FIG. 6 is a table used for distributing the management costs based on the compression level;

FIG. 8 is a table indicating the number of replacements acquired by the acquisition unit for number of replacements 701;

FIG. 11 is a diagram showing a concrete example of the processing of the file storage apparatus of the third embodiment;

FIG. 13 a diagram exemplifying the predetermined file structure;

FIG. 15 is a table exemplifying the correlation between the bit sequence and the user identification information;

DETAILED DESCRIPTION OF THE PREFERRED EMBODIMENTS

Embodiments of the present invention will be described hereinbelow with reference to the drawings. The present invention is not to be limited to the above embodiments and able to be embodied in various forms without departing from the scope thereof.

As the first embodiment, a file storage apparatus, which replaces a bit sequence, which matches a bit sequence correlated with a code and managed, with said code, thereby performing compression and storage of a file correlated with the user identification information and inputted, comprising a distribution unit for management cost, which performs distribution of management costs with respect to each user identification information, will be described.

Figure 1:
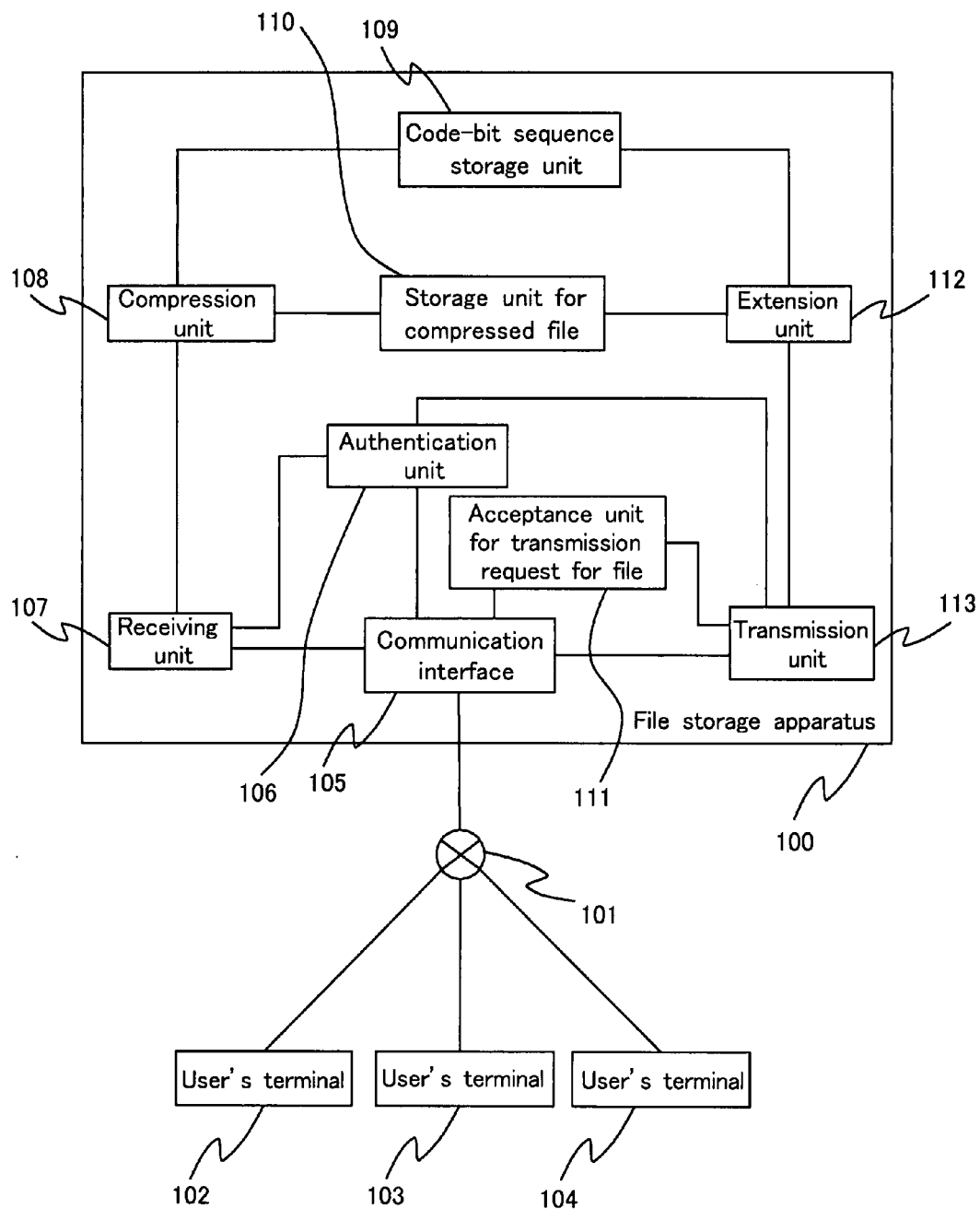
FIG. 1 is a functional block diagram of the fundamental configuration of the file storage apparatus.

FIG. 1 is a functional block diagram of the fundamental configuration of the file storage apparatus. Therefore, the functional block diagrams of the fundamental configuration of the file storage apparatus of respective embodiments are on the basis of the functional block diagram of FIG. 1. Hereinbelow, the fundamental configuration of the file storage apparatus in the functional block diagram of respective embodiments will be omitted.

The file storage apparatus 100 is connected to the communication network 101 such as the internet, and is accessible from the user's terminal 102, 103, and 104. The user's terminal connects to the file storage apparatus 100 by executing an FTP program etc. In this case, the authentication unit 106 determines if a match exists between user identification information and password via the communication interface 105, thereby carrying out authentication of the user.

If the authentication of the user by the authentication unit 106 is successful, the user uploads the file from the user's terminal. The uploaded file is received by the receiving unit 107 via the communication interface 105. After that, the compression unit 108 carries out compression of the file.

In the compression by the compression unit 108, the correlation between the code and the bit sequence, which have been stored and managed by the code-bit sequence storage unit 109, is referenced. Generally, the code is expressible by a smaller number of bits than that of the bit sequence correlated with the code. Accordingly, by replacing the bit sequence in the file with the code, it becomes possible to compress the file. Thus, the compressed file is stored by the storage unit for compressed file 110.

Figure 2:
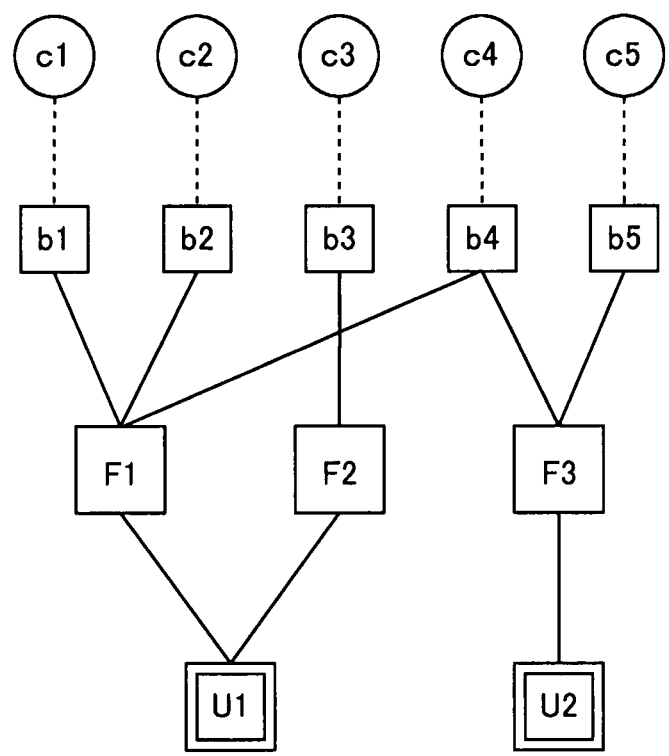
FIG. 2 is a diagram exemplifying the relation among the user identification information as identification information of the user, the file, the bit sequence, and the code.

FIG. 2 is a diagram exemplifying the relation among the user identification information as identification information of the user, the file, the bit sequence, and the code. The code c1 and the bit sequence b1 are correlated and stored by the code-bit sequence storage unit 109. Similarly, c2 and b2, c3 and b3, c4 and b4, and c5 and b5 are correlated and stored. If the user identified by U1 uploads the file F1 and F2, and F1 contains b1, b2, and b4, b1 is replaced with c1, b2 is replaced with c2, and b4 is replaced with c4. Similarly, the F2 contains b3, b3 is replaced with c3 and is stored. Similarly, the user identified by U2 uploads the file F3, and F3 contains b4 and b5, they are replaced with c4 and c5, and are stored, respectively.

As to the correlation between the bit sequence and the code, for example, the received file is decomposed to a predetermined unit such as a term by means of morphological analysis, and terms, phrases or sentences including terms, which appear more than one hundred times, are made. Note that, correlating bit sequences of many short terms, phrases or sentences with codes possibly causes reduction of the compression efficiency. In this case, a configuration, in which bit sequences of terms, phrases or sentences, which are shorter than a predetermined length, are not correlated with codes, may be useful.

In cases where the transmission request for file is sent from the user's terminal through an FTP program etc., the transmission request for file is accepted by the acceptance unit for transmission request for file 111 after the authentication by the authentication unit 106. After that, the extension unit 112 refers to the code and the bit sequence stored by the code-bit sequence storage unit 109, and replaces the code with the bit sequence correlated with the code and stored, thereby extending the file stored by the storage unit for compressed file 110. The transmission unit 113 transmits the file. Thus, the file received by the receiving unit 107 is restored and transmitted.

Note that the file storage apparatus 100 can be implemented by means of a computer, in which CPU, memory, hard disk, input/output interface, and communication interface etc. are connected via a bus. In this case, the authentication unit 106, the receiving unit 107, the compression unit 108, the code-bit sequence storage unit 109, the storage unit for compressed file 110, the acceptance unit for transmission request for file 111, the extension unit 112, and the transmission unit 113 can be implemented as modules etc. of a program. For example, the code-bit sequence storage unit 109 can be implemented as a module, which correlates the code with bit sequence, and stores them in the hard disk.

The compression unit 108 inputs the bit sequence to the module, and the code is returned for matching bit sequence. Further, when the extension unit 112 inputs the code, the bit sequence correlated with the code is returned. Furthermore, the correlation between the bit sequence and the code can be managed by an operator of the file storage apparatus 100 via the input/output interface. The storage unit for compressed file 110 performs writing and storing the compressed file to the hard disk, or reading of the file for the extension unit 112.

The authentication unit 106 is implemented as a module, which gains access to the communication interface 105, receives the user identification information and the password, examines the match between the user identification information and the password, and authenticates the user. The correlation between the user identification information and the password is stored in the hard disk etc.

The receiving unit 107 is implemented as a module, which gains access to the communication interface 105, temporarily stores the received file to a memory or a hard disk, and passes the received file to the compression unit 108. The compression unit 108 is implemented as a module, which reads the bit sequence of the file, performs input to the code-bit sequence storage unit 109, and if the bit sequence correlation with the code exists, acquires the code, and replaces it with the bit sequence of the file. The file thus compressed is passed to the module for implementing the storage unit for compressed file 110, which stores the file in the hard disk.

The acceptance unit for transmission request for file 111 is implemented as a module, which accepts the transmission request for file via the communication interface, and instructs the transmission of file to the transmission unit 113. The transmission unit 113 is implemented as a module, which instructs the extension of the file to the module for implementing the extension unit 112, and transmits the acquired file via the communication interface.

The extension unit 112 replaces the code in the file, of which transmission is instructed by the transmission unit 113, with the bit sequence managed by the code-bit sequence storage unit 109, thereby extending the file, and temporarily stores the result of the extension to the memory or the hard disk, and passes the module for implementing the transmission unit 1113.

According to the aforementioned configuration, the file storage apparatus, which replaces a bit sequence, which matches a bit sequence correlated with a code and managed, with said code, thereby performing compression and storage of a file correlated with the user identification information and inputted, is implemented.

In addition, it is possible to record the program configured with the above-mentioned modules. Therefore, it is possible to provide a medium in which the program for causing a computer to implement the file storage apparatus. Here, the medium corresponds to a tangible entity, which is able to store the bit information for a certain length of time, such as optical disk, magnetic-optical disk, or memory medium, other than magnetic disk such as flexible disk.

Note that the file storage apparatus is operatable, for example, as a mail server storing received e-mail, or as a web server in which a file written by HTML etc. is stored, and the file is browsable.

Figure 3:
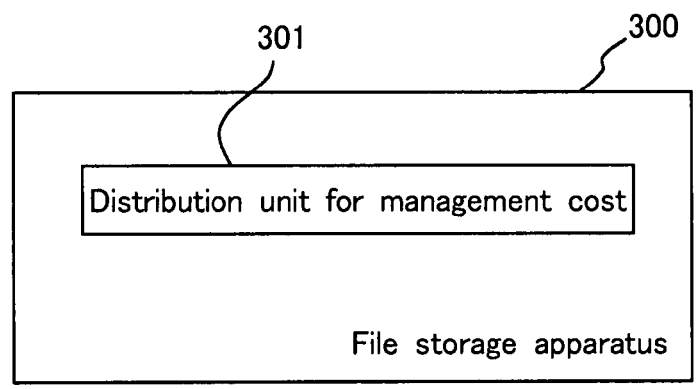
FIG. 3 is a functional block diagram of the file storage apparatus of the first embodiment.

FIG. 3 is a functional block diagram of the file storage apparatus of the first embodiment. The file storage apparatus 300 comprises the distribution unit for management cost 301.

The 'distribution unit for management cost' 301 performs the distribution of management cost with respect to each user identification information. The term 'management' corresponds to the term 'manage' in the terms 'bit sequence correlated with a code and managed'. More specifically, the management is performed for correlating the code and the bit sequence, which are stored by the code-bit sequence storage unit 109.

The term 'management cost' is cost necessary for the management. More specifically, it corresponds to cost for disk space necessary for storing the correlation between the code and the bit sequence, or to cost for CPU necessary for operating the compression unit 108 and the code-bit sequence storage unit 109. In the case of the disk space, the cost is measured on a byte basis. In the case of the operation cost for CPU, the cost is measured on a time basis. The result of the measurement may be indicated by a numerical value by means of a monetary value or a predetermined unit.

Further, although the term 'management cost' and the term 'fee to be charged' seem to have the same meaning, generally, they are different. For example, the fee for storage of the file can be equally charged to any user regardless of the size of the file or storage period. However, the management cost can vary according to each user. Therefore, the management cost for each user can vary in accordance with file size or with storage period. In this case, the same fee is charged to each user, and it is possible to put a limitation, so that each user can request file storage until a predetermined value, indicating the management cost for storage of file distributed by the distribution unit for management cost 301, is reached.

Generally, provider of pay-service can acquire profits by collecting fee exceeding the cost necessary to provide the service from the user. In the conventional service of leasing disk space, the server just stores the received file in the disk, so that the cost depends only or mainly on the size of the disk space. Therefore, the disk space is allocated to a user according to the fee paid by the user, so that it becomes impossible to store files, of which total size is larger than the allocated capacity, thereby setting the upper limit of the cost for the service. Under such circumstances, for example, measurement of the total size of the stored file on a byte basis corresponds to the measurement of the management cost for service provided to the user.

Meanwhile, in the present invention, the management cost for the computer system including operation of CPU necessary for compression and extension of file can be an important factor in addition to the size of the bit sequence configuring the file to be stored. Therefore, in order to provide a user-friendly service without waiting for processing of compression or extension, it is necessary to implement the file storage apparatus by means of a computer system, which is able to handle a heavy load and more expensive than the computer system used for the service of leasing disk space. Further, the service provider is required to pay the cost for operating the CPU of the computer system.

In the first method for calculating management cost of the present invention, for example, a high price per byte is uniformly set, and similarly to the prior art, the management cost is measured based on the disk size necessary for storage. Therefore, in this method for calculating management cost, if the price per byte is set to 1.2 times, and the saving of disk size by compression is effective, the service provider can make a profit. In addition, according to this method, actual sizes of storage, therefore, the total size of compression files and the total size of bit sequences are equal. Therefore, the provider of a pay service can reasonably determine the capacity of disk space to be provided. For example, in cases where the total storage size, which is distributed based on the management cost for compressed file stored by the storage unit for compressed file and on the management cost for the code-bit sequence storage unit, is allowed up to 1 GB to ten users respectively, and the storage unit for compressed file and the code-bit sequence storage unit are implemented on the one disk equipment, the computer system for implementing the file storage apparatus is configured by means of 10 GB disk equipment.

In the second method for calculating management cost of the present invention, as to the processing of bit sequence, which requires an expensive computer system, the management cost is calculated based on a high unit price, and as to the processing of bit sequence, which does not require an expensive computer system, the management cost is calculated based on a low unit price. For example, in FIG. 1, the management cost for the compressed file stored by the storage unit for compressed file 110 may be calculated based on the 1.0 times a predetermined unit price, and the management cost for the bit sequence stored by the code-bit sequence storage unit 109 may be calculated based on 1.2 times a predetermined unit price.

In cases where only the first method for calculating management cost is used, there is a possibility of the emergence of users, who use the service by means of the present invention in cases where compression of file is effective in storing the file, and use the service by means of the prior art in cases where compression of file is not effective in storing the file, so that the service provider who uses the service by means of the present invention cannot make a profit. Meanwhile, according to the second method for calculating management cost, even in the case of a file, of which any portion is not replaced with code and the entire portion is stored in the storage unit for compressed file 110, it is possible to store based on low unit price per byte. Accordingly, it becomes possible to prevent the emergence of such users.

In addition, in the case of the file, which is never replaced with a code, assuming that the file is a bit sequence, the entire file is correlated with a code. The code-bit sequence storage unit 109 stores it, and the storage unit for compressed file 110 stores a small code, of which the management cost is negligible, so that the calculation of the management cost is carried out only for the bit sequence stored by the code-bit sequence storage unit 109. This makes it possible to unify the management of the cost. In addition, in the case of using the second method for calculating management cost, the cost for storing the bit sequence correlated with the code, which has been used for replacement only once, may be 1.0 times of a predetermined unit price, and the cost for storing the bit sequence correlated with the code, which has been used for replacement more than once, may be 1.2 times a predetermined unit price.

Figure 4:
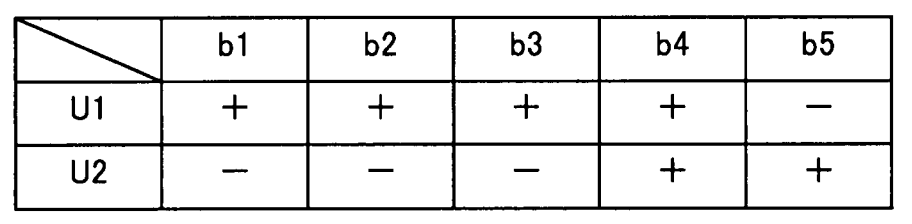

FIG. 4 is a table referenced for distributing the management cost. For example, as shown in FIG. 2, it is assumed that the user identification information, the file, the bit sequence, and the code are correlated with each other. In the case of the file uploaded by the user identified by U1, since the bit sequences of b1, b2, b3, and b4 are replaced, in the intersections of the line of 'U1' and the columns of 'b1', 'b2', 'b3', and 'b4' (i.e., sections corresponding to U1 and to b1, b2, b3, and b4), '+'s, which are correlated with U1, are stored respectively, and since the bit sequence of b5 is not replaced, in the intersection of the line of 'U1' and the column of 'b5', '−', which is correlated with U1, is stored. Similarly, in the intersections of the line of 'U2' and the columns of 'b1', 'b2', 'b3', 'b4' and 'b5', '−', '−', '−', '+' and '+', which are correlated with U2, are stored respectively.

In the case of distribution of the management cost, for example, number of '+'s correlated with respective user identification information is acquired, and the total management cost is distributed based on the number. Since the number of '+'s correlated with U1 (there is a case that this number is referred to as 'number of code references') is 4, and the number of '+'s correlated with U2 is 2, the distribution is carried out, so that the ratio of the management cost distributed to U1 to the management cost distributed to U2 is 4 to 2. For example, if the management cost is 60,000 yen, 40,000 yen is distributed to U1, and 20,000 yen is distributed to U2. Therefore, as the number of '+'s of the user identification information increases, more management cost is distributed. The weight of numbers of '+'s means that the code and the bit sequence are referenced by the code-bit sequence storage unit 109 many times, so that large amount of the management cost for disk space necessary for storage of correlation between the code and the bit sequence is distributed. Accordingly, it becomes possible to appropriately distribute the management cost.

In addition, the file storage apparatus 300 may update the table of FIG. 4 with respect to each compression by the compression unit 108. Therefore, every time the compression unit 108 detects the bit sequence correlated with the code and managed, if '−' is stored in the intersection of the line of the user identification information and the column of the bit sequence, '+' is stored, and if '+' is stored, it is not changed. Alternatively, calculation of the table of FIG. 4 may be carried out when the distribution unit for management cost 301 operates. Therefore, the calculation of the table of FIG. 4 is carried out, so that the file correlated with respective user identification information and stored by the storage unit for compressed file 110 is scanned, the code included therein is detected, and '+' is stored in the section corresponding to the bit sequence correlated with the code.

Figure 5:
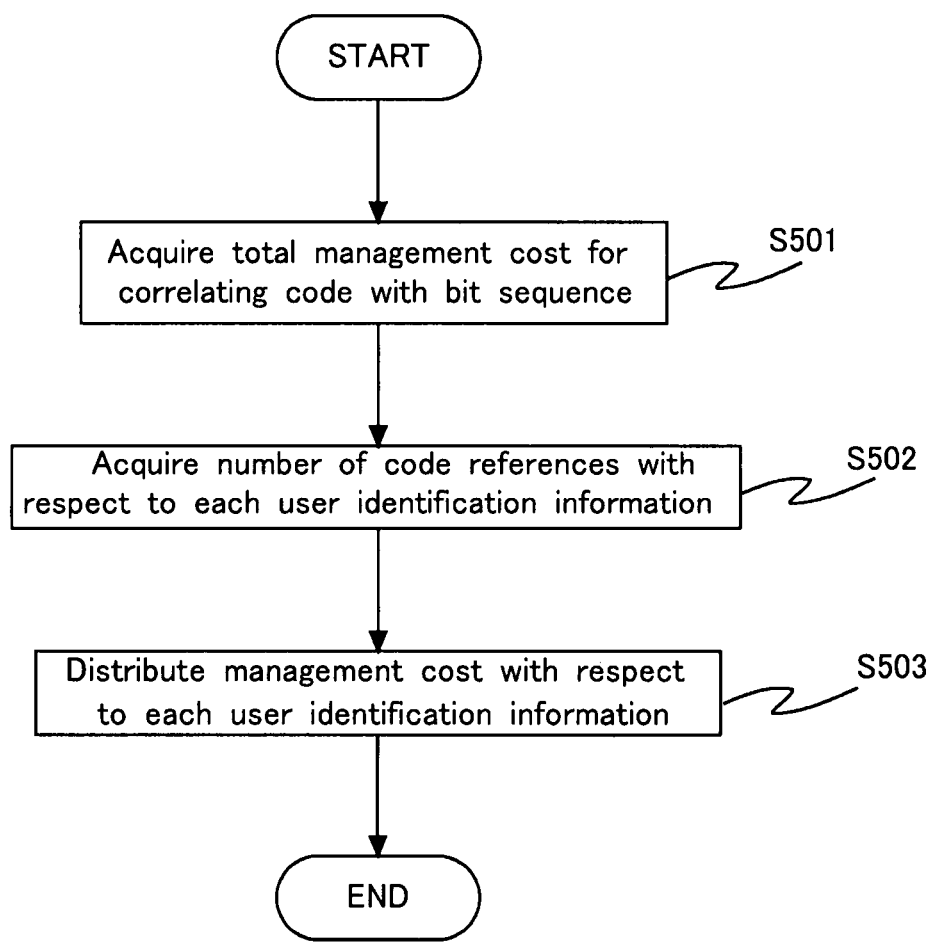
FIG. 5 is a flow chart showing the processing of the file storage apparatus of the first embodiment.

FIG. 5 is a flow chart showing processing of the file storage apparatus of the first embodiment. This flow chart explains the processing flow of the distribution unit for management cost 301. In the step S501, for example, the total management cost for correlating code with bit sequence is acquired. Alternatively, the total amount of operation cost for CPU may be acquired. In step S502, the number of code references with respect to each user identification information is acquired. Alternatively, the level of compression may be acquired with respect to each user identification information. In step S503, the total amount of management cost is distributed with respect to each user identification information. For example, the distribution is carried out based on the number of code references.

Note that it is easy to implement the processing of FIG. 5 as a module of program. For example, the total management cost is acquired, and is temporary stored in the memory etc., and the number of code references is acquired with respect to each user identification information by generating the data structure corresponding to FIG. 4, and is temporary stored in the memory etc. The total management cost stored in the memory etc. is distributed in accordance with the number of code references, and the result is stored in the memory etc. An access to the input/output interface is carried out, and the result is outputted.

In addition, as the method for distributing management cost, the method for distributing the management cost based on the amount of compression of files is cited. For example, if the total size of the file correlated with the user U1 upon reception of it by the receiving unit 107 is 500 KB, and it becomes 300 KB after the compression by the compression unit 108, the amount of compression is 200 KB (500−300=200). Similarly, if the total size of the file correlated with the user U2 upon reception of it by the receiving unit 107 is 800 KB, and it becomes 700 KB after the compression by the compression unit 108, the amount of compression is 100 KB. Then, since the user U1 seems to enjoy more benefit of the compression, the distribution is carried out, so that the ratio of the management cost distributed to U1 to the management cost distributed to U2 is 200 to 100.

FIG. 6 is a table used for the above method. In the table, the columns of 'Total size before compression' and 'Total size after compression' exist, and the total size of the file upon reception of it by the receiving unit 107 and the total size of the file stored by the storage unit for compressed file 110 are stored in them, respectively. The calculation of this table may be carried out every time the file is received by the receiving unit 107, is compressed by the compression unit 108, and is stored by the storage unit for compressed file 110. Alternatively, the calculation may be carried out at every operation of the distribution unit for management cost 301, by storing the reception log of the file in the receiving unit 107, and by acquiring the total size of the file stored in the storage unit for compressed file 110 with respect to each user identification information.

For example, in cases where the total size before compression for U1 is Sa1, and the total size after compression is Sb1, the numerical value indicating the amount of compression for U1 is calculated by the formula (Sa1−Sb1). Similarly, the numerical values indicating the amount of compression for other user identification information are calculated, thereby distributing the management cost.

According to the file storage apparatus, it becomes possible to distribute the management cost to the users in accordance with the consumption of resources necessary for compression of file (e.g., size of domain for storage of correlation between the code and the bit sequence), thereby enabling appropriate distribution.

As the second embodiment, the file storage apparatus, in which the number of replacements of the bit sequence with the code for the file is acquired with respect to each bit sequence, and the number of replacements is used to distribute the management cost to users, will be described.

Figure 7:
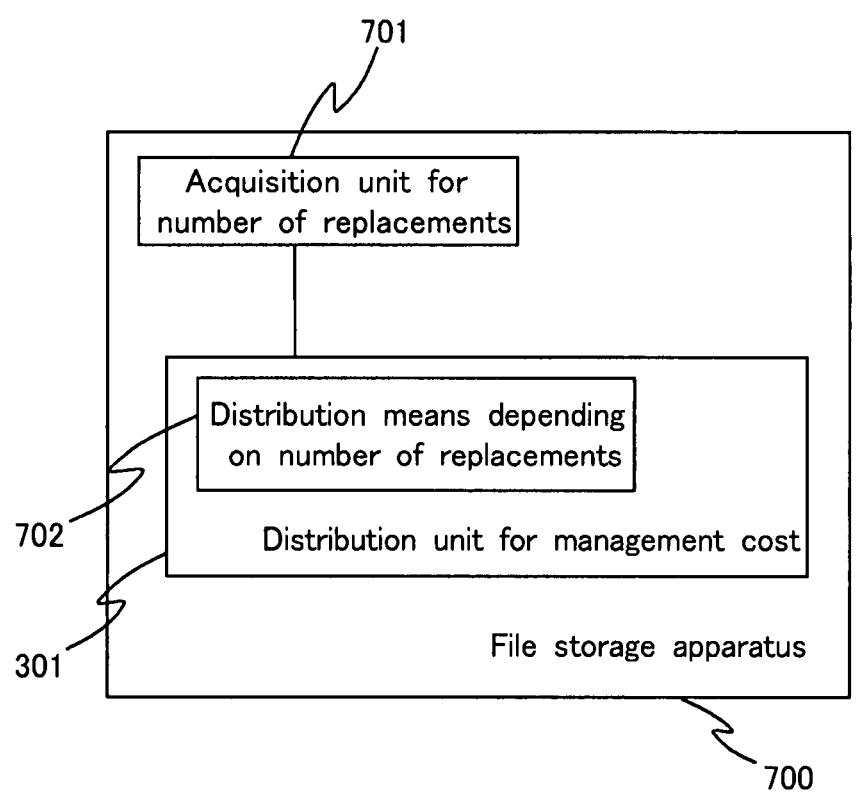
FIG. 7 is a functional block diagram of the file storage apparatus of the second embodiment.

FIG. 7 is a functional block diagram of the file storage apparatus of the second embodiment. The file storage apparatus 700 comprises the distribution unit for management cost 301, and the acquisition unit for number of replacements 701, and the distribution unit for management cost 301 comprises the distribution means depending on number of replacements 702. Therefore, the file storage apparatus according to the first embodiment further comprises the acquisition unit for number of replacements, and the distribution unit for management cost comprises the distribution means depending on number of replacements, so that the file storage apparatus of the second embodiment is implemented.

The 'acquisition unit for number of replacements' 701 acquires number of replacements correlated with the user identification information with respect to each replaced bit sequence for the inputted file correlated with the user identification information. For example, in cases where the bit sequence b1 appears five times in the file F1 uploaded by the user whose identification information is U1, and the respective five appearances of b1 is replaced by the code c1 correlated with b1, as to b1, the number 5 is acquired for U1. The acquisition is carried out by acquiring the number counted up and managed with respect to each replacement of the bit sequence with the code correlated with the bit sequence by the compression unit 108. Alternatively, the acquisition may be carried out by acquiring the number of the codes by scanning the file stored by the storage unit for compressed file 110 at every operation of the acquisition unit for number of replacements 701.

In addition, in cases where the number acquired by the acquisition unit for number of replacements 701 is counted up and is managed with respect to each replacement of the bit sequence with the code correlated with the bit sequence by the compression unit 108, the number of replacements may be managed considering the length of time for storing the file by the storage unit for compressed file 110 after the compression by the compression unit 108. For example, if the length of time is long, the number of replacements may be set to a number larger than the actual number. In addition, in cases where the actual number of replacements is large, a number smaller than the actual number may be acquired considering that the code relating to the large number of the replacements makes contribution to the compression of the file.

FIG. 8 is a table indicating number of replacements acquired by the acquisition unit for number of replacements 701. For example, it is assumed that in all files uploaded by the user whose identification information is U2, three bit sequences b1, two bit sequences b2, one bit sequence b3, two bit sequences b4, and no bit sequence b5 exist, and they are replaced with c1, c2, c3, c4, and c5, respectively, and are stored in the storage unit for compressed file 110. Here, in FIG. 8, b1, b2, b3, b4, and b5 are correlated with U2, and 3, 2, 1, 2, and 0 are stored in the line of U2. Similarly, the other user identification information U1, and U3 are processed.

Here, assuming that the management cost for the bit sequence b1 is E1, as to the management cost for b1, E1×($3/5$) is distributed to U2, and E1×($2/5$) is distributed to U3. Similarly, assuming that the management cost for the bit sequence b2 is E2, as to the management cost for b2, E2×($1/4$) is distributed to U1, E2×($2/4$) is distributed to U2, and E2×($1/4$) is distributed to U3. Thus, the management cost is distributed with respect to each bit sequence, and the total management cost for respective user identification information is acquired. Alternatively, the total management cost is initially acquired, sum of number of appearances of respective bit sequences in the file is acquired with respect to each user identification information, and the total amount of the management cost may be distributed in accordance with the value of this summation. Further, in cases where the bit sequence, which is not replaced with the code, exists, the management cost may be added.

In cases where the number of replacements acquired by the acquisition unit for number of replacements 701 is the number, which has been changed and different from the actual number, the table of FIG. 8 may store the actual number of replacements, and the acquisition unit for number of replacements 701 may acquire the number of replacements, which is a result of the process of changing such as weighting or adjusting. In this case, for example, the table of FIG. 8 is managed by the compression unit 108. Further, in cases where the file stored in the storage unit for compressed file 110 is deleted, before the deletion, the storage unit for compressed file 110 may carry out the processing of decreasing the number stored in the table of FIG. 8 in accordance with the number of codes included in the file to be deleted.

The 'distribution means depending on number of replacements' 702 performs distribution of the management cost by means of the number of replacements acquired by said acquisition unit for number of replacements 701. For example, the total number of replacements is acquired with respect to each user identification information, and the management cost is distributed in accordance with the total number. Alternatively, the result of multiplication of bits (or bytes) of bit sequences by the number of replacements may be acquired with respect to each user identification information, and may be used for the distribution. For example, if b1 is 100 bytes, b2 is 120 bytes, b3 is 150 bytes, and b4 is 200 bytes, as to U1, the formula 100×5+120×10+150×18+200×3 is used. Similarly, the calculations as to the other user identification information are carried out, thereby carrying out the distribution.

According to the second embodiment, by means of the number of replacements, it becomes possible to more appropriately distribute the management cost with respect to each user identification information.

As the third embodiment, the file storage apparatus, in which it is determined whether a bit sequence, which starts from a head of the file, matches one or multiple bit sequences correlated with the code, and a bit sequence, which is subsequent to the matching bit sequence, is correlated with a new code, and is stored, will be described.

Figure 9:
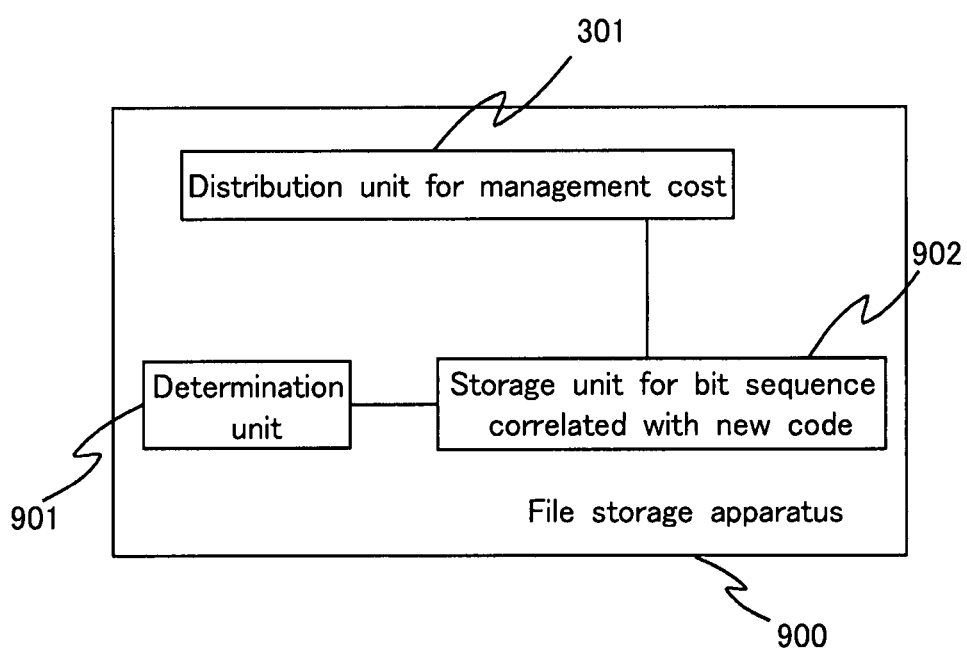
FIG. 9 is a functional block diagram of the file storage apparatus of the third embodiment.

FIG. 9 is a functional block diagram of the file storage apparatus of the third embodiment. The file storage apparatus 900 comprises the distribution unit for management cost 301, the determination unit 901, and the storage unit for bit sequence correlated with new code 902. In addition, the acquisition unit for number of replacements may be comprised, and the distribution unit for management cost 301 may comprise the distribution means depending on number of replacements. Therefore, the file storage apparatus of the third embodiment is the file storage apparatus according to the first or second embodiment comprising the acquisition unit for number of replacements, and the distribution unit for management cost comprises the determination unit 901, and the storage unit for bit sequence correlated with new code 902.

The 'determination unit' 901 determines whether a bit sequence matches one or multiple bit sequences correlated with the code. It is preferable that the bit sequence exists in the head or tail portion of the file. Here, the file corresponds to a file received by the receiving unit 107, and to a file before compression by the compression unit 108. Further, in cases where the determination process by the determination unit 901 and the compression process by the compression unit 108 are repeated recursively, the above file may correspond to a file under the compression process, which is a target of the determination by the determination unit 901. The determination unit 901 reads the bit sequence from the head portion of the file, and compares it with the bit sequences stored in the code-bit sequence storage unit 109 from the head portion, respectively, thereby determining how they match. The terms 'how they match' means a determination on any of the following cases: (1) not match at all, (2) the entire bit sequence matches the head portion of the file, (3) the head portion of the bit sequence matches the head portion of the file, (4) the entire bit sequence matches the entire file, or (5) the head portion of the bit sequence matches the entire file.

An example of (1) includes the case where the bit sequence is 'XY', and the content of the file is 'YZ'. An example of (2) includes the case where the bit sequence is 'AB', and the content of the file is 'ABC'. An example of (3) includes the case where the bit sequence is 'ABD', and the content of the file is 'ABC'. An example of (4) includes the case where the bit sequence is 'AB', and the content of the file is 'AB'. An example of (5) includes the case where the bit sequence is 'ABD', and the content of the file is 'AB'.

Note that the determination is not necessary to be carried out based on a bit, and predetermined successive bits, for example, 8 bits, therefore 1 byte may be used as a unit for comparison. Alternatively, 1024 bytes, therefore, 1 KB may be used as a unit for comparison. Further, if the storage device is a block device performing storage using a block as a unit, the size of block may be used as a unit for comparison.

The 'storage unit for bit sequence correlated with new code' 902 stores a bit sequence, which is subsequent to the matching bit sequence, correlated with new code. The terms 'store' and 'correlate' means storing the correlation between the code and the bit sequence in the code-bit sequence storage unit 109. In the above cases (2) and (4), the storage unit for bit sequence correlated with new code 902 has nothing to carry out. The reason for this is that the bit sequence in the file to be newly stored can be expressed by the code, which has been stored. Note that, in the above case (2), if the storage unit for compressed file 110 stores only the code, the content of the file acquired by replacement of the portion of the file, which matches the bit sequence stored by the code-bit sequence storage unit 109, with the code correlated with the bit sequence may be correlated with a new code. For example, in cases where the bit sequence is 'AB', the code correlated with the bit sequence is c1, and the content of the file is 'ABC', 'AB' included in 'ABC' is replaced with c1, thereby acquiring '(c1)C' (( ) is information indicating an existence of a code). This '(c1)C' may be correlated with the new code c2, and stored in the code-bit sequence storage unit 109, and the code c2 may be stored in the storage unit for compressed file 110. Alternatively, the acquired '(c1)C' is regarded anew as a target file of compression, and as a target of determination by the determination unit, so that the compression may be repeated recursively. Note that the 'bit sequence' in the present specification may correspond to something after being replaced with code. Therefore, the '(c1)C' including a code corresponds to the 'bit sequence' or to the 'file' in the present specification.

In the case (1), the storage unit for bit sequence correlated with new code 902 has nothing to carry out. The reason for this is that the bit sequence in the file to be newly stored cannot be expressed by the code, which has been stored. Note that, if the storage unit for compressed file 110 stores only the code, the storage unit for bit sequence correlated with new code 902 correlates the entire bit sequence of the file with a new code, and stores it, and the storage unit for compressed file 110 may store the new code. Further, in the middle of the recursive compression process, in cases where only the head codes match with each other between the file and the bit sequence, the determination unit determines as 'not detected'. This case is exceptionally included in case (1). For example, in the middle of the recursive process, in cases where '(c1)XY' is included in the bit sequence, and the content of the file is '(c1)YZ', it is determined not that they partially match with each other, but that they do not match at all, even if the (c1) is included in both of them.

In case (3), the head portion of the bit sequence stored by the code-bit sequence storage unit 109 and the head portion of bit sequence in the file, which matches the head portion of the bit sequence, are correlated with a new code and stored in the code-bit sequence storage unit 109. By means of the new code, the head portion of the bit sequence and the head portion of the file are replaced with the new code. For example, in cases where the bit sequence stored in the code-bit sequence storage unit 109 is 'ABD', and the content of the file is 'ABC', 'AB' is correlated with a new code c3, and stored in the code-bit sequence storage unit 109, and 'ABD' is replaced with '(c3)D', and the content of the file is replaced with '(c3)C'.

In case (5), the content of the file is correlated with a new code, and is stored in the code-bit sequence storage unit 109. For example, in cases where the bit sequence stored in the code-bit sequence storage unit 109 is 'ABD', and the content of the file is 'AB', 'AB' is correlated with a new code c4, and stored in the code-bit sequence storage unit 109. In this case, the bit sequence 'ABD' stored in the code-bit sequence storage unit 109 may be stored anew as '(c4)D'.

Figure 10:
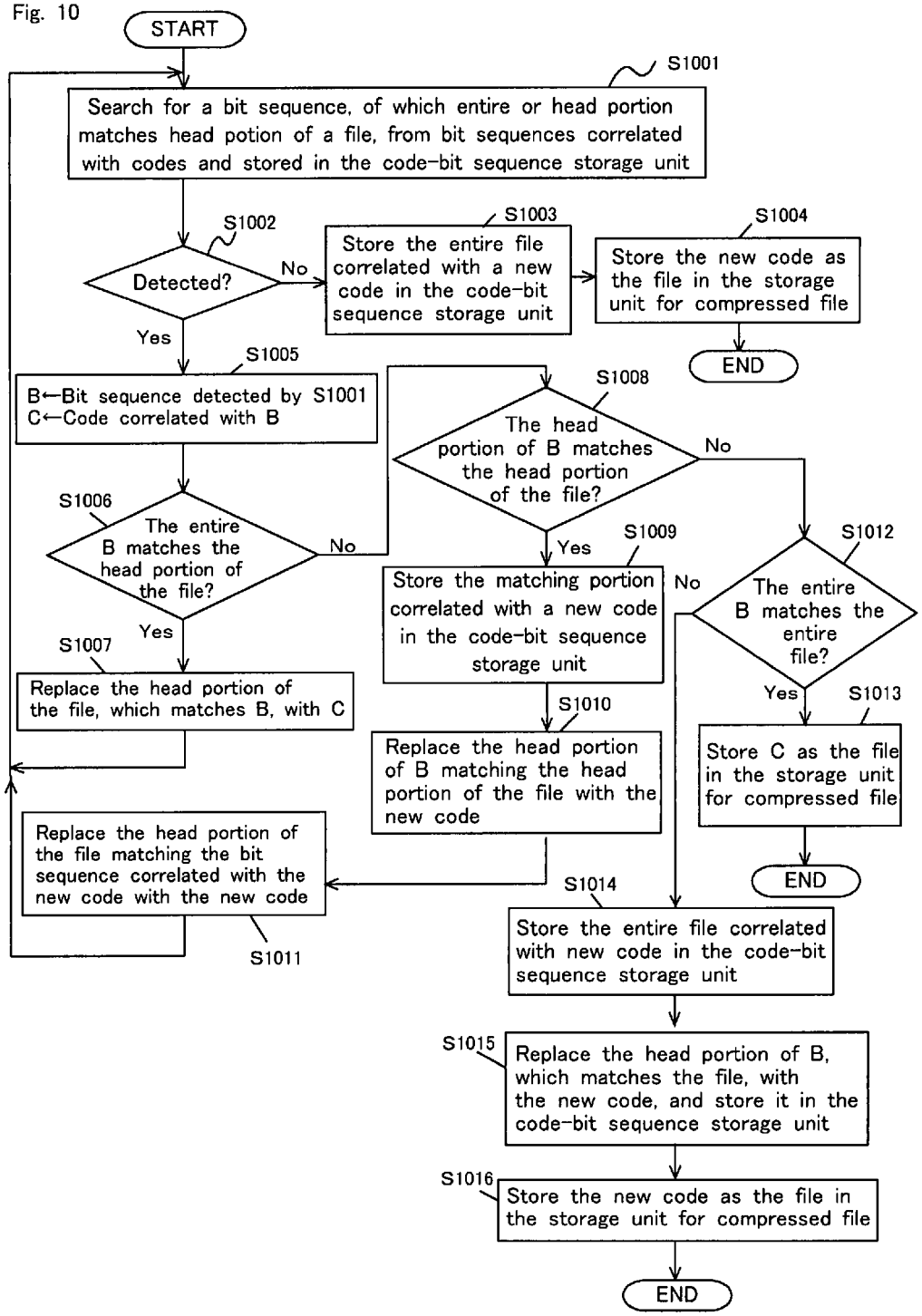
FIG. 10 is a flow chart showing the processing of the file storage apparatus of the third embodiment.

FIG. 10 is a flow chart mainly showing processing of the determination unit 901, and the storage unit for bit sequence correlated with new code 902 of the file storage apparatus of the third embodiment.

In step S1001, the search for the bit sequence, of which the entire or head portion matches the head portion of a file, from bit sequences correlated with codes and stored in the code-bit sequence storage unit 109 is carried out by the determination unit 901. Therefore, it is confirmed whether a bit sequence, of which the entire or head portion matches the head portion of the received file, exists in the bit sequences correlated with codes.

In step S1002, it is determined whether the existence of the bit sequence has been detected by step S11001. If the existence of the bit sequence has not been detected, which corresponds to case (1), so that step S1003 and S1004 are carried out. Therefore, in step S1003, the entire file correlated with a new code is stored in the code-bit sequence storage unit 109. Further, in step S1004, the new code (the code correlated with the entire file and stored in the code-bit sequence storage unit 109 in step 1003) is stored as the file in the storage unit for compressed file 110.

If the existence of the bit sequence has been detected, step S1005 is carried out. In step S1005, the bit sequence detected by S1001 is substituted to the parameter B, and the code correlated with the bit sequence substituted with parameter B is substituted to the parameter C. At this point, since the above cases (2) to (5) are conceivable, hereinbelow, each case is determined in steps S1006, S1008, and S1012. Note that, if multiple existences are detected, it is preferable that the longest bit sequence is substituted. Further, one of the existences may be selected by means of the other standard. Alternatively, the configuration, in which the multiple bit sequences never include the common head portion, therefore, the common head portion is certain to be replaced with the code correlated with another bit sequence, thereby detecting only one existence, may be implemented.

In step S1006, it is determined whether the entire bit sequence substituted with parameter B matches the head portion of the file. If the result is 'YES', which corresponds to the above case (2), so that step S1007 is carried out. If the result of step S1006 is 'NO', which corresponds to the above cases (3) to (5), step S1008 is carried out.

In step S1007, the head portion of the file, which matches the bit sequence substituted with the parameter B, is replaced with the code substituted to C. Thus, compression is carried out by replacing the code. After that, the processing is returned to step S1001, it is determined whether the bit sequence regarded as a new file, therefore, the replaced code and the bit sequence subsequent to it matches the bit sequence stored in the code-bit sequence storage unit 109.

In step S1008, it is determined whether the head portion of the bit sequence substituted with parameter B matches the head portion of the file. If the result of this determination is 'YES', which corresponds to the above case (3), step S1009 is carried out. If the result is 'NO', which corresponds to the above case (4) or (5), step S1011 is carried out.

In step S1009, the matching portion between the head portion of the bit sequence substituted to the parameter B and the head portion of the file is correlated with a new code, and is stored in the code-bit sequence storage unit. For example, in cases where the bit sequence substituted with the parameter B is 'ABD', and the content of the file is 'ABC', 'AB' is correlated with a new code.

In step S1010, the head portion of the bit sequence substituted with the parameter B matching the head portion of the file is replaced with the new code, and is stored in the code-bit sequence storage unit. For example, 'AB' of 'ABD' is replaced with the new code.

In step S1011, the head portion of the file matching the bit sequence correlated with the new code is replaced with the new code. For example, 'AB' of 'ABC' is correlated with a new code. After that, processing is returned to step S1001. Note that, since the file includes the new code, the result of search indicates no existence. Accordingly, step S1003 may be carried out immediately.

In step S1012, it is determined whether the entire bit sequence substituted with the parameter B matches the entire file. If the result of this determination is 'YES', which corresponds to the above case (4), step S1013 is carried out. If the result is 'NO', which corresponds to the above case (5), step S1014 is carried out.

In step S1013, the code substituted to the parameter C is stored as the file in the storage unit for compressed file 110.

In step S1014, the entire file correlated with new code is stored in the code-bit sequence storage unit 109.

In step S1015, the head portion of the bit sequence substituted to the parameter B, which matches the file, is replaced with the new code, and is stored in the code-bit sequence storage unit. For example, in cases where 'ABD' is substituted to the parameter B, and the content of the file is 'AB', 'AB' of 'ABD' is replaced with the new code.

In step S1016, the new code is stored as the content of the file in the storage unit for compressed file 110.

FIG. 11 is a diagram showing a concrete example of the processing of the file storage apparatus of the third embodiment. At the outset, it is assumed that nothing is stored in the code-bit sequence storage unit 109, and the user U3 uploads the file consisted of the bit sequence 'AAACCC' (hereinbelow, referred to as 'file consisted of 'AAACCC''). In this case, nothing is stored in the code-bit sequence storage unit 109, so that step S1002, the processing flow branches to 'NO', and steps S1003 and S1004 are carried out. Therefore, the entire 'AAACCC' is correlated with the new code c1, and the file consisted of the code is stored in the storage unit for compressed file 110. When the file is stored in the storage unit for compressed file 110, it is correlated with the U3, which is the user identification information of the user who has uploaded. The table of FIG. 11 (1) shows the states of the code-bit sequence storage unit 109 and the storage unit for compressed file 110 at this point. Therefore, the bit sequence 'AAACCC' is correlated with the code c1, and is stored in the code-bit sequence storage unit 109. Further, the user identification information U3 and the code c1 are correlated, and stored in the storage unit for compressed file 110. Here, the number of replacements of the bit sequence 'AAACCC' is 1.

Subsequently, it is assumed that the user U2 uploads the file consisted of the bit sequence 'AAAAAA'. Here, the head portion of the file consisted of the bit sequence 'AAAAAA' matches 'AAA' of the bit sequence 'AAACCC' correlated with the code c1. Accordingly, in step S1002, the processing flow branches to 'YES', and in step S1006, the processing flow branches to 'NO', and in step S1008, the processing flow branches to YES, so steps S1009, S1010, and S1011 are carried out. Consequently, the bit sequence 'AAA' is correlated with a new code c2, and is stored, so that the bit sequence 'AAACCC' correlated with the code c1 becomes '(c2) CCC'. The content of the file 'AAAAAA' becomes '(c2) AAA'. After that, the processing is returned to step S1001, and is carried out, so that '(c2) AAA' is correlated with the new code c3, thereby producing the results in FIG. 11 (2).

Subsequently, it is assumed that the user U3 uploads the file consisting of the bit sequence 'BBBBBBB'. The bit sequence does not match any bit sequence stored in the code-bit sequence storage unit 109, so steps S1003 and S1004 are carried out, and the bit sequence 'BBBBBBB' is correlated with the new code c4 and is stored, thereby producing the results in FIG. 11 (3).

Subsequently, it is assumed that the user U1 uploads the file consisted of the bit sequence 'AAA'. The bit sequence matches the bit sequence 'AAA' correlated with c2 and stored, so that it is replaced with c2, thereby producing the results in FIG. 11 (4).

Subsequently, it is assumed that the user U2 uploads the file consisted of the bit sequence 'BBBB'. The bit sequence 'BBBB' of the file matches the head portion of the bit sequence 'BBBBBBB', so that in step S1006, the processing flow branches to 'NO', in step S1008, the processing flow branches to 'NO', and in step S1012, the processing flow branches to 'NO'. In step S1014, the content of the file 'BBBB' is correlated with the new code c5, in step S1015, the bit sequence correlated with c4 is replaced with '(c5) BBB', and in step S1016, c5 is stored in the storage unit for compressed file 110, thereby producing the results in FIG. 11 (5).

Subsequently, it is assumed that the user U2 uploads the file consisted of the bit sequence 'BBAAA'. The bit sequence 'BB' in the head portion of the file matches the head portion of the bit sequence correlated with c5, so that in step S1009, the new code c6 is correlated with the bit sequence 'BB', and in step S1010, c5 is correlated with '(c6) BB'. In step S1011, the content of the file becomes '(c6) AAA', and after the processing is returned to step S1001, in steps S1003 and S1004, the new code c7 and '(c6) AAA' are correlated. Here, the number of replacements of the bit sequence 'BB' correlated with the code c6 is 3. The reason for this is that the number of replacements '2' of the bit sequence 'BBBB' correlated with the code c5 and the number of replacements '1' of the head portion of the file newly uploaded makes '3'. In other words, this value '3' indicates that the head portions 'BB' of three files ((3) 'BBBBBBB', (5) 'BBBB', and (6) 'BBAAA'), which have been uploaded separately, are stored as one bit sequence. This produces the results in FIG. 11 (6).

Note that, in cases where the abovementioned processing is carried out by means of the determination unit 901, and the storage unit for bit sequence correlated with the new code 902, the processing may be carried out after reversing the arrangement of bits or bytes of the file received by the receiving unit 107. The reason for this is that in many cases, the body follows the header, and the headers are different, but the bodies are the same (e.g., spam mail). In order to first carry out processing of the body, the arrangement of bits or bytes of the file may be reversed.

According to the third embodiment, it becomes possible to automatically collect the bit sequence to be managed.

As the fourth embodiment, the file storage apparatus, in which the file is separated into fragments in accordance with a predetermined structure of the file, and the fragment is set to a target of compression as an independent file, will be described.

Figure 12:
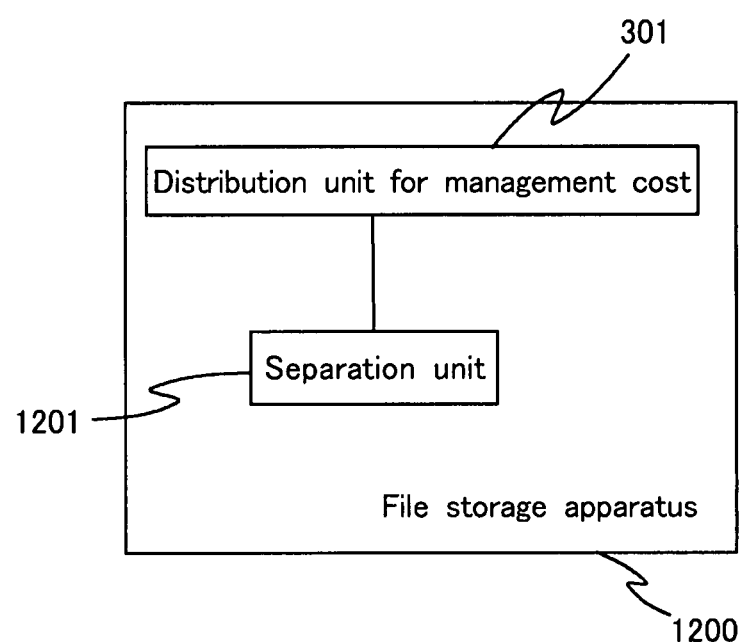
FIG. 12 is a functional block diagram of the file storage apparatus of the fourth embodiment.

FIG. 12 is a functional block diagram of the file storage apparatus of the fourth embodiment. The file storage apparatus 1200 comprises the distribution unit for management cost 301, and the separation unit 1201. Note that the file storage apparatus 1200 may comprise the acquisition unit for number of replacements, and the distribution unit for management cost 301 may comprise the distribution means depending on number of replacements. In addition, the determination unit and the storage unit for bit sequence correlated with new code may be comprised. Therefore, the file storage apparatus of the fourth embodiment is the file storage apparatus according to any one of the first to third embodiments comprising the separation unit.

The 'separation unit' 1201 separates the file into fragments in accordance with a predetermined structure of the file. For example, assuming that one e-mail is one file, it has a structure consisted of the header and the body. In this case, the separation unit 1201 separates it into the fragment of the header and the fragment of the body. Further, in the case of programming language expressed based on the specific syntax, separation into some fragments is possible in accordance with structure in syntax. Further, in the case of the text using JIS code, start and end of the portion including kanji and kana are included, so that it becomes possible to separate the text into the portion including kanji and kana, and the portion consisted of ASCII characters by using the start and end as a clue.

FIG. 13 is a diagram exemplifying the predetermined file structure. FIG. 13 (A) and (B) show the file having a structure separated by '<SEPARATOR>'. The portion preceding the first '<SEPARATOR>' is called as a header, and in cases where the multiple '<SEPARATOR>'s exist, the portion subsequent to the last '<SEPARATOR>' is called as a footer, and the other portion is called as a body. Therefore, in FIG. 13 (A), 'ABC' is a header, 'GHIJKLMNOP' is a body, and there is no footer. Further, in FIG. 13 (B), 'DEF' is a header, 'GHIJKLMNOP' is a body, and 'XYZ' is a footer. Accordingly, in FIGS. 13 (A) and (B), the header and footer are different, but the body is the same. Therefore, by separating them into two or three portions (in other words, 'fragments'), which are the header, body, and footer if it exists, and by carrying out the processing as described in the third embodiment, it becomes possible to carry out the compression at high compression rate.

Therefore, in the fourth embodiment, the fragment separated by the separation unit 1201 is the target of compression as an independent file.

In the file storage apparatus of the fourth embodiment, syntax analysis of the file received by the receiving unit 107 is carried out, and the file is separated into fragments, and the compression unit 108 carries out compression with respect to each fragment, the results of compression with respect to each fragment are correlated with each other, and stored by the storage unit for compressed file 110. The terms 'correlated with each other' means that in cases where the file is separated into fragments, the results of compression with respect to each fragment are extended as one file by the extension unit 112, thereby making it restorable.

According to the fourth embodiment, separation into fragments is carried out in accordance with a predetermined file structure, and compression is carried out with respect to each fragment, so that it becomes possible to carry out the compression at high compression rate.

As the fifth embodiment, the file storage apparatus, in which a portion or total management cost for a specific bit sequence is distributed to specific user identification information, will be described.

Figure 14:
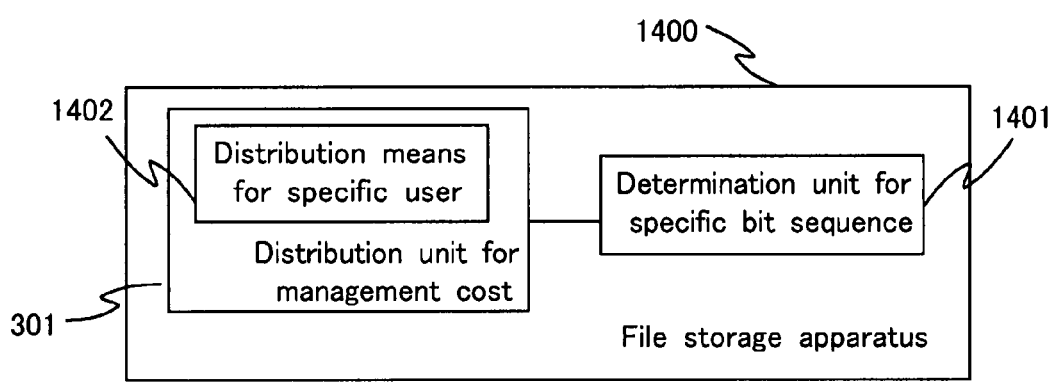
FIG. 14 is a functional block diagram of the file storage apparatus of the fifth embodiment.

FIG. 14 is a functional block diagram of the file storage apparatus of the fifth embodiment. The file storage apparatus 1400 comprises the distribution unit for management cost 301 and the determination unit for specific bit sequence 1401, and the distribution unit for management cost 301 comprises the distribution means for specific user 1402. Note that the file storage apparatus 1400 may comprise the acquisition unit for number of replacements, and the distribution unit for management cost 301 may comprise the distribution means depending on number of replacements. In addition, the determination unit, the storage unit for bit sequence correlated with new code, and the separation unit may be comprised. Therefore, the file storage apparatus of the fifth embodiment is the file storage apparatus according to any one of the first to fourth embodiments comprising the determination unit for specific bit sequence, wherein the distribution unit for management cost comprises the distribution means for specific user.

The 'determination unit for specific bit sequence' 1401 determines whether said specific bit sequence has been used for the compression in the file storage apparatus 1400 under the situation, in which a specific bit sequence is correlated with specific user identification information, and is stored. For example, the entire or portion of bit sequence correlated with code and stored in the code-bit sequence storage unit 109 is correlated with specific user identification information, and it is determined whether the bit sequence correlated with the specific user identification information is replaced with the code.

FIG. 15 is a table showing that the bit sequence b1 is correlated with the user identification information U1, the bit sequence b5 is correlated with the user identification information U2, and the bit sequence b4 is correlated with the user identification information U3. The purpose of these correlations is to distribute the management cost for specific bit sequence to specific user identification information correlated with the specific bit sequence. For example, in cases where the bit sequence indicates a production name, the storage cost for the portion of the production name in the file including the production name is charged to the user identification information correlated with the specific bit sequence. This makes it possible to promote the specific name of product, thereby advertising it. In addition, if the bit sequence is a specific character string expressing a specific idea, it becomes possible to popularize the idea.

The 'distribution means for specific user' 1402 performs distribution of a portion or total management cost to be distributed to a user identified by correlated with the specific bit sequence if the determination unit for specific bit sequence 1401 determines that the specific bit sequence has been used.

For example, in cases where 1,500 units as the management cost are distributed by the distribution unit for management cost 301 at the first stage, if the management cost for the bit sequence b4 is 50 units, the entire 50 units are distributed to the user identification information U3 correlated with b4, and the remaining 1,450 units are distributed to U1 at the second stage. Alternatively, 25 units, a portion of the 50 units, may be distributed to U3, and 1,475 units may be distributed to U1. Alternatively, units more than 50 units, for example, 80 units, which are 1.6 times of 50 units, may be distributed to U3, and the excess 30 units may be converted to a monetary value etc. and returned to U1. This makes it possible to give incentive to use a specific word, catch-phrase, slogan, idea, or name of product to the users identified by the user identification information other than U3.

According to the fifth embodiment, it becomes possible to distribute the management cost for specific bit sequence to specific user identification information. This makes it possible to promote a name of a product that a specific user desires to promote. In addition, the bit sequence of word of a specific idea is correlated with specific user identification information, and amount of fee counted for each user identification information, so that it becomes possible to know preferences of the user of the file storage apparatus. Further, by storing papers written upon regular examination, it becomes possible to mark them at once.

As the sixth embodiment, the file storage apparatus, in which a fee for file storage is calculated based on the distributed management, will be described.

Figure 16:
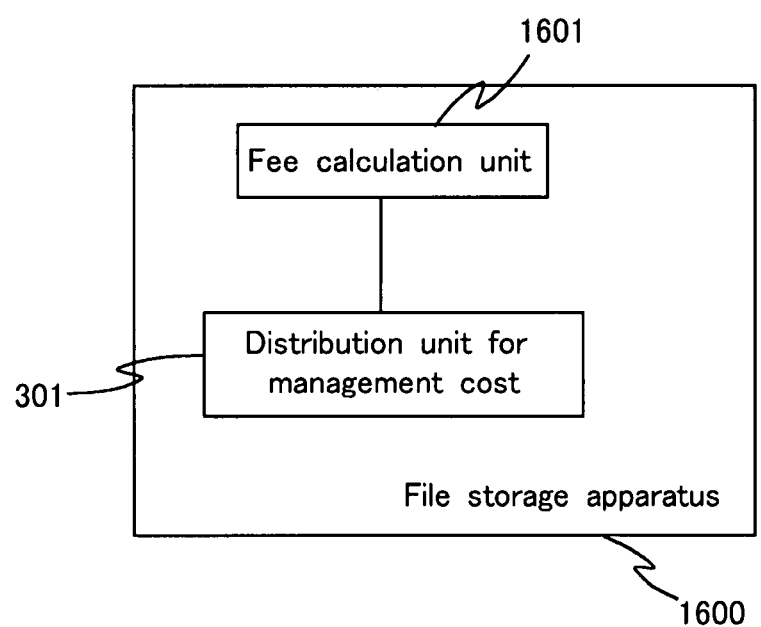
FIG. 16 is a functional block diagram of the file storage apparatus of the sixth embodiment.

FIG. 16 is a functional block diagram of the file storage apparatus of the sixth embodiment. The file storage apparatus 1600 comprises the distribution unit for management cost 301 and the fee calculation unit 1601. Note that the file storage apparatus 1600 may comprise the acquisition unit for number of replacements, and the distribution unit for management cost 301 may comprise the distribution means depending on number of replacements. In addition, the determination unit, the storage unit for bit sequence correlated with new code, and the separation unit may be comprised. Therefore, the file storage apparatus of the sixth embodiment is the file storage apparatus according to any one of the first to fifth embodiments comprising the fee calculation unit 1601.

The 'fee calculation unit' 1601 calculates a fee for file storage based on the management cost distributed by said distribution unit for management cost 301. The term 'based on' means that the management cost distributed with respect to each user identification information is referenced, and the fee is calculated in accordance with certain rules. For example, if the management cost is for disk space necessary for storing correlation between the code and the bit sequence stored by the code-bit sequence storage unit 109, the disk space distributed with respect to each user identification information and fee per unit of disk space are multiplied, thereby calculating the fee. Alternatively, the management cost-fee corresponding table may be provided for calculating fees. Moreover, if the fee is more than a predetermined fee, it may be discounted. Alternatively, if the fee is less than a predetermined fee, the predetermined fee may be calculated as the minimum amount of fee. Further, if the fee exceeds a predetermined fee, the predetermined fee may be calculated as a flat fee.

The calculation of fee by the fee calculation unit may be carried out with respect to each distribution of management cost by distribution unit for management cost 301. For example, if the distribution of management cost is carried out at the end of the month, the calculation of fee is carried out at the end of the month. In addition, if the calculation of fee by the fee calculation unit 301 is carried out at the fixed time every day, the average value such as average value of variation in the distributed management cost per month is acquired with respect to each user identification information, and the fee calculation unit 1601 may calculate on the basis of the average value.

According to the sixth embodiment, fees are calculated in accordance with distribution of management cost, so that it becomes possible for a service provider to distribute fees necessary for storing file to user identification information.

What is claimed is:

1. A file storage apparatus connected by public network to terminals controlled by multiple users, comprising:
a storage device;
a digital data processing device coupled to the storage device; and
a memory device storing a program to control the digital data processing device;
wherein said program comprises;
a code-bit sequence storage unit, which stores a plurality of managed bit sequences, wherein each of the plurality of the managed bit sequences is correlated with a code and managed,
a compression unit, which replaces a bit sequence, which matches a managed bit sequence out of the plurality of managed bit sequences stored in said code-bit sequence storage unit, with said code correlated with said managed bit sequence, thereby performing compression and storage of a file correlated with a user identification information and inputted from said terminals, wherein said managed bit sequence is referenced in the multiple compression processes correlated to different user identification information,
an extension unit, which replaces said code in the compressed file, with said managed bit sequence correlated with said code and managed in said code-bit sequence storage unit, thereby performing extension of the file,
an acquisition unit for the existence of replacements, which, for each of the plurality of managed bit sequences, for each user identification information, acquires the existence of replacements correlated with the user identification information with respect to the managed bit sequence for the inputted files correlated with the user identification information, wherein said replacements are conducted by said compression unit, and
a distribution unit for management of cost for managing each of the plurality of managed bit sequences, which, for each of the plurality of managed bit sequences, performs distribution of management costs for managing said managed bit sequence with respect to each user identification information, by means of the existence of replacements acquired by said acquisition unit for the existence of replacements.

2. A file storage apparatus connected by public network to terminals controlled by multiple users, comprising:
- a storage device;
- a digital data processing device coupled to the storage device; and
- a memory device storing a program to control the digital data processing device;
- wherein said program comprises;
- a code-bit sequence storage unit, which stores a plurality of managed bit sequences, wherein each of the plurality of the managed bit sequences is correlated with a code and managed,
- a compression unit, which replaces a bit sequence, which matches a managed bit sequence out of the plurality of managed bit sequences stored in said code-bit sequence storage unit, with said code correlated with said managed bit sequence, thereby performing compression and storage of a file correlated with a user identification information and inputted from said terminals, wherein said managed bit sequence is referenced in the multiple compression processes correlated to different user identification information,
- an extension unit, which replaces said code in the compressed file, with said managed bit sequence correlated with said code and managed in said code-bit sequence storage unit, thereby Performing extension of the file,
- an acquisition unit for a number of replacements, which, for each of the plurality of managed bit sequences, for each user identification information, acquires the number of replacements correlated with the user identification information with respect to the managed bit sequence for the inputted files correlated with the user identification information, wherein said replacements are conducted by said compression unit, and
- a distribution unit for management of cost for managing each of the plurality of managed bit sequences, which, for each of the plurality of managed bit sequences, performs distribution of management costs for managing said managed bit sequence with respect to each user identification information, by means of the number of replacements acquired by said acquisition unit for the number of replacements.

3. The file storage apparatus according to claim 1 or 2, comprising:
- a determination unit, which determines whether a bit sequence matches one or multiple managed bit sequences correlated with the code; and
- a storage unit for bit sequence correlated with new code, which stores a bit sequence, which is subsequent to the matching bit sequence, correlated with a new code.

4. The file storage apparatus according to claim 1 or 2, comprising:
- a separation unit, which separates the file into fragments in accordance with a predetermined structure of the file, wherein
- the fragment separated by said separation unit is set to be a target of compression as an independent file.

5. The file storage apparatus according to claim 1 or 2, which stores a specific managed bit sequence correlated with specific user identification information, comprising:
- a determination unit for specific managed bit sequence, which determines whether said specific managed bit sequence has been used for the compression, wherein
- said distribution unit for management of cost for managing said managed bit sequence comprises;
- a distribution means for specific user, which performs distribution of a portion or total management cost to be distributed to a user identified by the user identification information correlated with the specific managed bit sequence if the determination unit for specific bit managed sequence determines that the specific managed bit sequence has been used.

6. The file storage apparatus according to claim 1 or 2, comprising:
- a fee calculation unit, which calculates a fee for file storage based on the management cost distributed by said distribution unit for management of cost for managing said managed bit sequence.

7. A method for operating a file storage apparatus connected by public network to terminals controlled by multiple users, comprising:
- a code-bit sequence storage step, which stores a plurality of managed bit sequences, wherein each of the plurality of the managed bit sequences is correlated with a code and managed,
- a compression step, which replaces a bit sequence, which matches a managed bit sequence out of the plurality of managed bit sequences stored in said code-bit sequence storage step, with said code correlated with said managed bit sequence, thereby performing compression and storage of a file correlated with the a user identification information and inputted from said terminals, wherein said managed bit sequence is referenced in the multiple compression processes correlated to different user identification information,
- an extension step, which replaces said code in the compressed file, with said managed bit sequence correlated with said code and managed in said code-bit sequence storage step, thereby performing extension of the file,
- an acquisition step for the existence of replacements, which, for each of the plurality of managed bit sequences, for each user identification information, acquires the existence of replacements correlated with the user identification information with respect to the managed bit sequence for the inputted files correlated with the user identification information, wherein said replacements are conducted by said compression step, and
- a distribution step for management of cost for managing each of the plurality of managed bit sequences, which, for each of the plurality of managed bit sequences, performs distribution of management costs for managing said managed bit sequence with respect to each user identification information, by means of the existence of replacements acquired by said acquisition step for the existence of replacements.

8. A file storing program recorded on a computer readable medium for causing a computer to function as a file storage apparatus connected by public network to terminals controlled by multiple users, comprising:
- a code-bit sequence storage unit, which stores a plurality of managed bit sequences, wherein each of the plurality of the managed bit sequences is correlated with a code and managed,
- a compression unit, which replaces a bit sequence, which matches a managed bit sequence out of the plurality of managed bit sequences stored in said code-bit sequence storage unit, with said code correlated with said managed bit sequence, thereby performing compression and storage of a file correlated with a user identification information and inputted from said terminals, wherein said managed bit sequence is referenced in the multiple compression processes correlated to different user identification information, an extension unit, which replaces said code in the compressed file, with said managed bit sequence correlated with said code and managed in said code-bit sequence storage unit, thereby Performing extension of the file, an acquisition unit for the existence of replacements, which, for each of the plurality of managed bit sequences, for each user identification information, acquires the existence of replacements correlated with the user identification information with respect to the managed bit sequence for the inputted files correlated with the user identification information, wherein said replacements are conducted by said compression unit, and a distribution unit for management of cost for managing each of the plurality of managed bit sequences, which, for each of the plurality of managed bit sequences, performs distribution of management costs for managing said managed bit sequence with respect to each user identification information, by means of the existence of replacements acquired by said acquisition unit for the existence of replacements.

9. A method for operating a file storage apparatus connected by public network to terminals controlled by multiple users, comprising;

a code-bit sequence storage step, which stores a plurality of managed bit sequences, wherein each of the plurality of the managed bit sequences is correlated with a code and managed, a compression step, which replaces a bit sequence, which matches a managed bit sequence out of the plurality of managed bit sequences stored in said code-bit sequence storage step, with said code correlated with said managed bit sequence, thereby performing compression and storage of a file correlated with a user identification information and inputted from said terminals, wherein said managed bit sequence is referenced in the multiple compression processes correlated to different user identification information, an extension step, which replaces said code in the compressed file, with said managed bit sequence correlated with said code and managed in said code-bit sequence storage step, thereby performing extension of the file, an acquisition step for a number of replacements, which, for each of the plurality of managed bit sequences, for each user identification information, acquires the number of replacements correlated with the user identification information with respect to the managed bit sequence for the inputted files correlated with the user identification information, wherein said replacements are conducted by said compression step, and a distribution step for management of cost for managing each of the plurality of managed bit sequences, which, for each of the plurality of managed bit sequences performs distribution of management costs for managing said managed bit sequence with respect to each user identification information, by means of the number of replacements acquired by said acquisition step for the number of replacements.

10. A file storing program recorded on a computer readable medium for causing a computer to function as a file storage apparatus connected by public network to terminals controlled by multiple users, comprising:

a code-bit sequence storage unit, which stores a plurality of managed bit sequences, wherein each of the plurality of the managed bit sequences is correlated with a code and managed, a compression unit, which replaces a bit sequence, which matches a managed bit sequence out of the plurality of managed bit sequences stored in said code-bit sequence storage unit, with said code correlated with said managed bit sequence, thereby performing compression and storage of a file correlated with a user identification information and inputted from said terminals, wherein said managed bit sequence is referenced in the multiple compression processes correlated to different user identification information, an extension unit, which replaces said code in the compressed file, with said managed bit sequence correlated with said code and managed in said code-bit sequence storage unit, thereby performing extension of the file, an acquisition unit for a number of replacements, which, for each of the plurality of managed bit sequences, for each user identification information, acquires the number of replacements correlated with the user identification information with respect to the managed bit sequence for the inputted files correlated with the user identification information, wherein said replacements are conducted by said compression unit, and a distribution unit for management of cost for managing each of the plurality of managed bit sequences, which, for each of the plurality of managed bit sequences, performs distribution of management costs for managing said managed bit sequence with respect to each user identification information, by means of the number of replacements acquired by said acquisition unit for the number of replacements.

\* \* \* \* \*